United States Patent
Jokinen et al.

(10) Patent No.: US 7,684,357 B2
(45) Date of Patent: Mar. 23, 2010

(54) ENHANCED PRE-NOTIFICATION PROCEDURE FOR GERAN MBMS

(75) Inventors: Harri Jokinen, Pertteli (FI); Guillaume Sebire, Espoo (FI); Rami Vaittinen, Littoinen (FI)

(73) Assignee: Nokia Corporation, Espoo (FI)

( * ) Notice: Subject to any disclaimer, the term of this patent is extended or adjusted under 35 U.S.C. 154(b) by 1010 days.

(21) Appl. No.: 11/226,566

(22) Filed: Sep. 14, 2005

(65) Prior Publication Data

US 2006/0072534 A1    Apr. 6, 2006

Related U.S. Application Data

(60) Provisional application No. 60/611,140, filed on Sep. 17, 2004.

(51) Int. Cl.
*G08C 17/00* (2006.01)
*H04B 1/16* (2006.01)

(52) U.S. Cl. .................... 370/311; 455/343.2

(58) Field of Classification Search ......... 370/229–232, 370/310, 311, 330, 337, 347, 390, 252, 253, 370/389, 400, 401, 412, 413, 415, 417; 455/414.1–414.3, 455/404.1, 458, 343.1–343.3; 340/7.32, 340/7.33, 7.35, 7.36
See application file for complete search history.

(56) References Cited

U.S. PATENT DOCUMENTS

| | | | |
|---|---|---|---|
| 6,728,300 B1 * | 4/2004 | Sarkar et al. | 370/337 |
| 6,816,736 B2 * | 11/2004 | Laroia et al. | 370/347 |
| 6,839,565 B2 | 1/2005 | Sarkkinen et al. | |
| 6,977,957 B2 * | 12/2005 | Sarkar et al. | 370/337 |
| 7,197,333 B2 * | 3/2007 | Hwang et al. | 455/560 |
| 2003/0223394 A1 | 12/2003 | Parantainen et al. | 370/336 |
| 2004/0057387 A1 | 3/2004 | Yi et al. | 370/252 |

(Continued)

FOREIGN PATENT DOCUMENTS

EP    1 377 099 A1    1/2004

(Continued)

OTHER PUBLICATIONS

Pack, S.; Kafle, V.; Yanghee Choi, "Performance analysis of IP paging protocol in IEEE 802.11 networks," Local Computer Networks, 2003. LCN '03. Proceedings. 28th Annual IEEE International Conference on , vol., No., pp. 673-680, Oct. 20-24, 2003.*

(Continued)

*Primary Examiner*—Aung S Moe
*Assistant Examiner*—Kerri M Rose
(74) *Attorney, Agent, or Firm*—Harrington & Smith

(57) ABSTRACT

A system and method for reducing idle mode power consumption for mobile stations (MS) that have joined a Multimedia Broadcast/Multicast Service (MBMS) session and are waiting for the session to start. The invention is also directed to reducing the power consumption of an MS for which an MBMS session is inactive. In alternative aspects of the invention, the power consumption of mobile stations is reduced in the absence of ongoing MBMS session activity. Reduced power consumption is achieved by eliminating the need to read notification messages from an MBMS specific notification paging group when the notification message is for a different MBMS session than the paging group that the MS has currently joined.

56 Claims, 2 Drawing Sheets

U.S. PATENT DOCUMENTS

2004/0142706 A1    7/2004    Kim et al. .................... 455/458
2005/0054331 A1*    3/2005    Balachandran et al. ... 455/414.1
2005/0076369 A1*    4/2005    Cai et al. ...................... 725/62
2006/0019641 A1*    1/2006    Vayanos et al. .......... 455/414.1
2008/0261554 A1*    10/2008    Keller et al. ............. 455/404.1

FOREIGN PATENT DOCUMENTS

KR    10-2002-0087993    12/2002

OTHER PUBLICATIONS

Motegi, M.; Kayama, H.; Umeda, N., "Adaptive battery conservation management using packet QoS classifications for multimedia mobile packet communications," Vehicular Technology Conference, 2002. Proceedings. VTC 2002-Fall. 2002 IEEE 56th , vol. 2, No., pp. 834-838 vol. 2, 2002.*

"3rd Generation Partnership Project; Technical Specification Group Services and System Aspects; Multimedia Broadcast/Multicast Service (MBMS); Architecture and functional description" (Release 6), 3GPP TS 23.246 V6.7.0 (Jun. 2005).

3rd Generation Partnership Project; Technical Specification Group GSM/EDGE; Radio Access Network; Multimedia Broadcast Multicast Service (MBMS) in the GERAN; Stage 2; (Release 6), 3GPP TS 43.246 V6.4.0 (Jun. 2004).

3rd Generation Partnership Project; Technical Specification Group Services and System Aspects; Multimedia Broadcast Multicast Service; Stage 2; (Release 6), 3GPP TS 22.146 V6.6.0 (Sep. 2004).

3GPP TSG-GERAN2 MBMS AdHoc Turin, Italy, 13-15.09.204; Tdoc G2MBMS-04002; "Addition of MBMS Serivice Idetifier in Mobile Identity"; 44.018, pp. 1-4.

* cited by examiner

ENHANCED PRE-NOTIFICATION PROCEDURE FOR GERAN MBMS

RELATED APPLICATIONS

This application claims priority from U.S. Provisional Patent Application Ser. No. 60/611,140 which was filed on Sep. 17, 2004.

BACKGROUND OF THE INVENTION

1. Field of the Invention

The invention is directed to a system and methods for transmitting/receiving data during Broadcast mode and Multicast mode and, more particularly, to a system and method for reducing idle mode power consumption for mobile stations (MS) that have joined a Multimedia Broadcast/Multicast Service (MBMS) session and await the start of the session.

2. Detailed Description of the Related Art

MBMS (Multimedia Broadcast/Multicast Service) is a unidirectional Point-to-Multipoint (p-t-m) multicast/broadcast service in which data is transmitted from a single source entity to a group of users located in a specific area. MBMS may comprise a selection of unidirectional p-t-m bi-directional point-to-point (p-t-p) transmissions of multimedia data, such as text, audio, picture, or video, from a single source entity to a multiplicity of users in a service area. As stated in the $3^{rd}$ Generation Partnership Project (3GPP) Technical Specification (TS) 22.146, "Multimedia Broadcast/Multicast Service; Stage 1", it is a goal of MBMS is to allow the provision of multiple instances of a p-t-p service with a single transmission over a radio interface as a radio multicast. "Service area" for a given MBMS service is hereafter to be understood as the geographical area (i.e. set of cells) where the service is made available.

MBMS has two modes, e.g., Broadcast mode and Multicast mode. The main difference between these two modes is that in Broadcast mode all MBMS users in the service area are targeted for receipt of transmitted data, whereas in Multicast mode it is possible to address only a subset of the MBMS users in the service area for receipt of the data. As defined in the 3GPP TS 22.146, "Multimedia Broadcast/Multicast Service; Stage 1," Multicast mode typically requires a user to subscribe to a multicast group before receiving the service.

As defined in the 3GPP TS 43.246, "MBMS in the Global System for Mobile communication (GSM) Enhanced Data GSM Environment (EDGE) Radio Access Network (GERAN); Stage 2", a mobile station (MS) that has joined a paging group and has requested an MBMS session monitors an MBMS specific paging group for MBMS notifications. In order to permit the MS to save power by not reading all messages on the MBMS notification paging group, a single pre-notification bit (i.e., a flag) is sent on the primary paging group of the MS. This flag indicates that the MS must read the MBMS notification paging group or that the MS is not required to read the notification paging group. When the MS is not required to read the MBMS notification paging group, the network is permitted to send, instead of normal paging messages, other messages on the paging channel. In this case, however, it is not always possible to provide an indication of the status of the pre-notification flag. As a result, the MS is required to read the MBMS notification paging group even if a notification at that specific instant in time would not occur.

One problem with the prior art solutions for reducing MS power consumption, which is discussed in G2-MBMS04002 "Discussion paper: MBMS Pre-notification and Notification", Ericsson 3GPP GERAN2 adhoc on MBMS, Turin, Italy, is that MBMS mobile stations may easily be required to read all MBMS specific paging group messages. This will occur if new MBMS sessions start frequently. Public land mobile network (PLMN) wide MBMS sessions need to be notified in all cells and location area wide MBMS sessions need to be notified in all cells of a location area. In addition, MBMS sessions intended for smaller areas to which a specific cell still belongs may exist. Moreover, MBMS sessions may occur even more frequently outside of busy periods when more network capacity would become available for downloading and recreational services, for example. In this case, frequent notifications are more likely to occur throughout any given day. In order to account for and process "lost" pre-notifications, the MS may be required to continuously read all MBMS specific paging group messages. If the discontinuous reception (DRX) period for an MBMS session is equal to the basic paging group of the MS, the power consumption of the MS will be increased by approximately 100%. Typically, the DRX period is used to minimize battery consumption in the MS. The DRX is defined using three parameters, i.e., DRX on/off, DRX period (paging group definition) and non-DRX timer, e.g., how long the MS stays in a non-DRX mode after the last transfer of data.

Another problem associated with the prior art solution for reducing MS power consumption is that MBMS sessions may be notified very frequently in a cell. As a result, an MBMS mobile station would be required to continuously read the MBMS paging group even if the pre-notification flag informs the MS about incoming notifications for MSMS sessions to which this particular MS has not joined.

SUMMARY OF THE INVENTION

The invention is directed to a system and method for reducing idle mode power consumption for mobile stations (MS) that have joined a Multimedia Broadcast/Multicast Service (MBMS) session and are waiting for the session to start. The invention is also directed to reducing the power consumption of an MS for which an MBMS session is inactive. In alternative aspects of the invention, the power consumption of mobile stations is reduced in the absence of ongoing MBMS session activity.

Reduced power consumption is achieved by eliminating the need to read notification messages from an MBMS specific notification paging group when the notification message is for a different MBMS session than the paging group that the MS has currently joined. In accordance with the invention, excessive pages from a MBMS notification paging group to the MS, in addition to the basic paging group, are eliminated. As a result, neighbor cell system information type 3 and type 4 (SI3 and SI4) decoding and cell broadcast channel (CBCH) reception from a serving cell can be performed without conflicting with MBMS tasks.

The system and method of the invention provides the option to eliminate the need to define a specific MBMS notification paging group. Here, the MS is permitted to enter non-DRX mode after a pre-notification is transmitted to the MS, which permits the actual notification to be sent at any paging group. This permits significant flexibility during load sharing between different paging groups. As a result, extended paging can be avoided, which results in a reduction of the power that is consumed by the MS, even when the MS is not involved in an MBMS session. For example, power consumption is reduced in MSs that are members of an MBMS session and those MBMS MSs that have not joined any MBMS sessions or are not waiting for the broadcast of an MBMS session to begin.

In accordance with the invention, the MS is informed about an upcoming notification via pre-notification information that at least partially identifies the MBMS bearer service which is to be notified. In an embodiment of the invention, if the pre-notification information fully identifies the MBMS bearer service (at least uniquely within a given Public land mobile network (PLMN)), then the identity of the actual MBMS session within the MBMS bearer service to be notified may also be transmitted.

The Temporary Mobile Group Identity (TMGI) is used for MBMS notification purposes. The broadcast/multicast service center (BM-SC) allocates a single globally unique TMGI per MBMS bearer service. Here, the TMGI is comprised of two parts, i.e. a globally unique MCC/MNC identity (e.g. a PLMN ID) and a local MBMS bearer service identity that is unique within the PLMN.

In accordance with the invention, a full TMGI that provides a unique identification of the MBMS Bearer Service across PLMNs is sent to the MS. Preferably, a TMGI excluding the PLMN information is sent. As a result, a unique identification of the MBMS Bearer Service within a given PLMN is provided, and a pre-notification with low or high granularity can be used. Granularity relates to the relative size, scale, level of detail, or depth of penetration that characterizes an object or activity. In accordance with the contemplated embodiments, it is possible to transmit the identity of the MBMS session to be notified, along with the TMGI or the TMGI without the PLMN ID, hence obtaining the highest possible granularity. When the actual session is not indicated at pre-notification, a lower granularity is obtained. An even lower granularity is achieved when only a subset of the TMGI is used (e.g., a TMGI excluding the PLMN ID or a modulo of the TMGI). Given the integers a, b and n, the expression a≡b (mod n) (i.e., "a is congruent to b modulo n") means that a and b have the same remainder when divided by n, or equivalently, that a-b is a multiple of n.

The system and method of the invention eliminates the need for an MS waiting for MBMS notifications to read an additional paging group where an addressed notification would actually not occur. Moreover, extended paging can be avoided, which reduces power consumption of all mobiles stations monitoring the paging group where extended paging occurs.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PRESENTLY PREFERRED EMBODIMENTS

Figure 1:
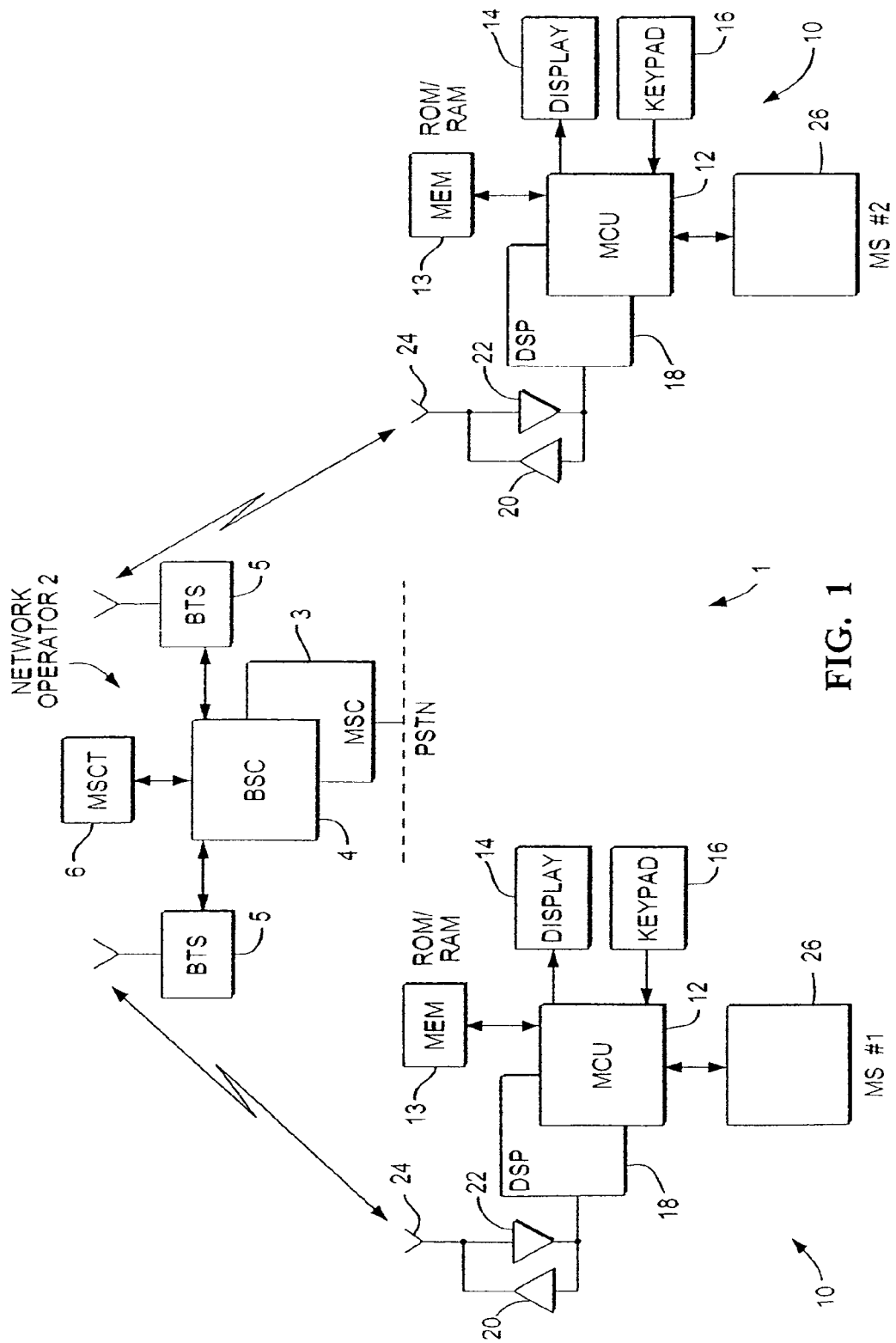
FIG. 1 is an exemplary block diagram of a wireless communication system in which the method of the invention is implemented.

The invention is directed to a system and method for reducing idle mode power consumption for mobile stations (MS) that have joined a Multimedia Broadcast/Multicast Service (MBMS) session and are waiting for the session to start. FIG. 1 shows a simplified block diagram of an embodiment of an exemplary wireless telecommunications system 1 that includes a plurality of mobile terminals or stations 10. Two mobile stations (MSs) 10 are shown, with one being designated MS#1 and the other MS#2. Although two mobile stations are shown, more than two are preferably used in accordance with the present invention.

FIG. 1 also shows an exemplary network operator 2 having, for example, a mobile switching center (MSC) 3 for connecting to a telecommunications network, such as the Public Switched Telephone Network (PSTN), at least one base station controller (BSC) 4, and a plurality of base transceiver stations (BTS) 5 that transmit in a forward or downlink direction both physical and logical channels to the mobile stations 10 in accordance with a predetermined air interface standard. It is assumed that a reverse or uplink communication path exists from the mobile station 10 to the network operator, which conveys mobile originated access requests and traffic, as well as signaling for implementing the invention. The BTSs 5 define cells, which can be different sizes, different frequencies and so forth.

The air interface standard may conform to a Time Division Multiple Access (TDMA) air interface, and the network may be a Universal Mobile Telecommunications System (UMTS) network or other type of network. However, the teachings of the present invention apply equally to Code Division Multiple Access (CDMA) networks, as well as to other network types.

The network operator 2 can include a Message Service Center (MSCT) 6 that receives and forwards messages for the MS 10, such as Short Message Service (SMS) messages, or any wireless messaging technique including e-mail and Supplementary Data Services. Furthermore, enhancements to SMS can be used, such as one under development and known as Multimedia Messaging Service (MMS), wherein image messages, video messages, audio messages, text messages, executables and the like, and combinations thereof, can be transferred between a network and a mobile station.

The mobile station (MS) 10 typically includes a microcontrol unit (MCU) 12 having an output coupled to an input of a display 14 and an input coupled to an output of a keyboard or keypad 16. The MS 10 may be considered to be a handheld radiotelephone, such as a cellular, mobile telephone or a personal digital assistant (PDA), and may have a microphone and a speaker (not shown) for conducting voice communications. The MS 10 could also be contained within a card or module that is connected during use to another device. For example, the MS 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received data packets and data packets prepared for transmission, etc. The memory 13 is assumed to store the various parameters which are used by the MS 10 for performing cell reselection.

A separate, removable SIM (not shown) can be also be provided, the SIM storing, for example, a preferred Public Land Mobile Network (PLMN) list and other subscriber-related information. The ROM is assumed, for the purposes of this invention, to store a program enabling the MCU 12 to execute the software routines required to operate in accordance with the presently preferred embodiments of the present invention.

The MS 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator 2. The receiver 22 is used for making signal measurements used in the cell reselection process.

In accordance with the invention, the MS 10 is informed about an upcoming notification via pre-notification information that at least partially identifies the MBMS bearer service which is to be notified. In an embodiment of the invention, if the pre-notification information fully identifies the MBMS bearer service (at least uniquely within a given public land mobile network (PLMN)), then the identity of the actual MBMS session within the MBMS bearer service to be notified may also be transmitted.

As defined in 3GPP TS 23.246, "Multimedia Broadcast/Multicast Service (MBMS); Architecture and functional description", the Temporary Mobile Group Identity (TMGI) is used for MBMS notification purposes. The broadcast/multicast service (BM-SC) allocates a single globally unique TMGI per MBMS bearer service. Here, the TMGI is comprised of two parts, i.e. a globally unique MCC/MNC identity (e.g. a PLMN ID) and a local MBMS bearer service identity that is unique within the PLMN. On the one hand, the TMGI will be transmitted to user equipment (UE) via a service activation procedure for multicast MBMS bearer services. On the other hand, the TMGI can be obtained via a service announcement, as described in TS 23.246 (see, e.g., "Service Announcement" for broadcast service). In this case, the TMGI is a radio resource efficient MBMS bearer service identifier that is equivalent to the MBMS bearer service identification consisting of IP multicast address and access point node.

In accordance with the invention, a full TMGI that provides a unique identification of the MBMS bearer service across PLMNs is sent to each MS 10. Preferably, a TMGI that excludes the PLMN information is sent. As a result, a unique identification of the MBMS bearer service within a given PLMN is provided. This permits a pre-notification with higher granularity to be achieved. Granularity relates to the relative size, scale, level of detail, or depth of penetration that characterizes an object or activity. In accordance with the contemplated embodiments, it is possible to transmit the identity of the MBMS session to be notified to each MS 10, along with the TMGI or the TMGI without the PLMN ID.

If the network attempts to page a large number of mobile stations, then a lower number of bits are used for the pre-notification information. Here, a parameter having a short bit length that is defined as a function of the TMGI may be used to provide the pre-notification to each MS 10. Preferably, this parameter is a modulo of a variable portion of the TMGI. However, it is also possible to use any predefined function of the TMGI. Given the integers a, b and n, the expression a≡b (mod n) (i.e., "a is congruent to b modulo n") means that a and b have the same remainder when divided by n, or equivalently, that a-b is a multiple of n.

Performing pre-notifications via the TMGI with or without a PLMN ID permits a specific MS 10 to fully identify whether the incoming pre-notification information addresses the specific MS 10. If the incoming pre-notification information does not address the specific MS 10, then the MS 10 would not be required to read any additional messages. As a result, extra power consumption is not caused by the MBMS pre-notifications.

Pre-notifications accurately address the actual MBMS session that is in progress. As a result, it is possible to activate non-DRX mode after each pre-notification is matched with its relevant MS 10. In turn, activation of non-DRX mode after each pre-notification permits the actual notification to be sent on any paging group, or even on blocks reserved for only granting an MS 10 with access to an MBMS session.

In accordance with the invention, each MS 10 is no longer required to read more than the normal paging group, when no notifications are addressed to the MS. As a result, the likelihood for conflicts to occur when reading non-addressed notifications that are not addressed to the MS and cell broadcast channels, neighbor cell system information type 3 and type 4 (i.e., SI3/SI4 on a common control channels (CCCH) cell) is eliminated. In the worst case, it should be noted that the mobile station may be required to continuously read two paging groups (e.g., the normal paging group and the MBMS specific notification paging group). In this case, it then becomes impossible to read CBCH or neighbor cell system information for some DRX cycles.

Figure 2:
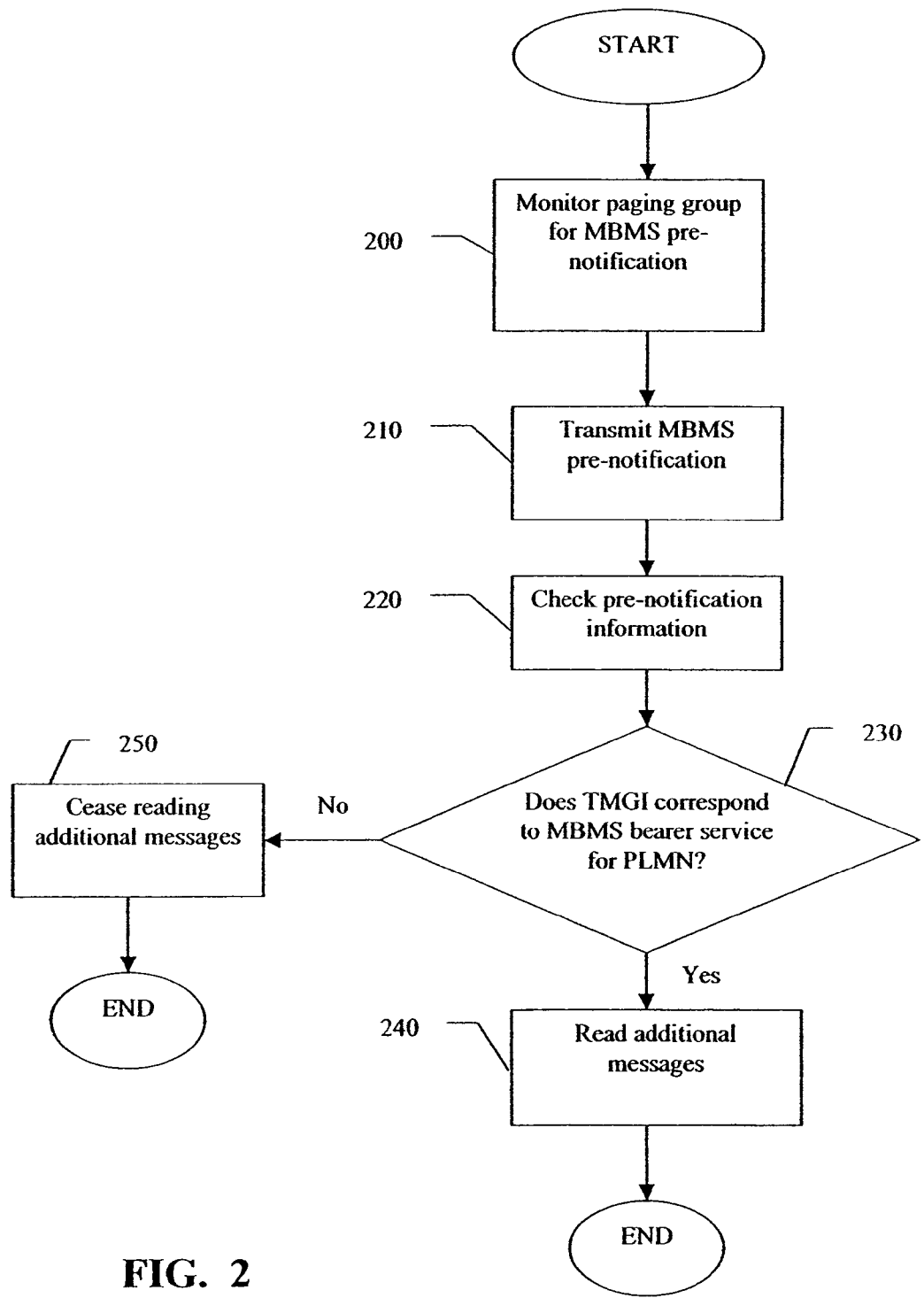
FIG. 2 is a flow chart illustrating the steps of the method in accordance with the present invention.

FIG. 2 is a flow chart illustrating the steps of the method in accordance with the present invention. An MBMS specific paging group is monitored to detect MBMS notifications, as indicated in step 200. Here, the paging group is monitored by a MS that has requested to join an MBMS session.

Next, MBMS pre-notification information is transmitted within an MBMS pre-notification message to the MS that made the request to join the MBMS session, as indicated in step 210. The pre-notification information is a unique Temporary Mobile Group Identity (TMGI) which is allocated by the broadcast/multicast service for each MBMS bearer service. The TMGI is comprised of two parts, i.e. a globally unique MCC/MNC identity (e.g. a PLMN ID) and a local MBMS bearer service identity that is unique within the PLMN. Preferably, a TMGI that excludes the PLMN information is sent. As a result, a unique identification of the MBMS bearer service within a given PLMN is provided.

A check of the pre-notification information in the MBMS notification message is then performed to acquire the TMGI, as indicated in step 220. The TMGI is then checked to determine whether it corresponds to the MBMS bearer service for the PLMN, as indicated in step 230. If the TMGI corresponds to the MBMS bearer service for a joined MBMS session, then the MS continues to read additional messages, as indicated in step 250. If the TMGI does not correspond to the MBMS bearer service for a PLMN, then the MS terminates the reading of any further messages to conserve power, as indicated in step 250.

Using the system and method of the invention, a mobile station waiting for MBMS notifications would never, or at most very rarely, be required to read an additional paging group where an addressed notification would actually not occur. Moreover, extended paging can be avoided, which reduces power consumption of all mobiles stations monitoring the paging group where extended paging occurs.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method, comprising:
   obtaining pre-notification information that at least partially identifies a multimedia broadcast/multicast service bearer service that is to be notified; and
   transmitting the pre-notification information to at least one mobile station, wherein the pre-notification information comprises at least a portion of a temporary mobile group identity.

2. The method of claim 1, wherein the at least a portion of the temporary mobile group identity that is transmitted in the pre-notification information does not comprise public land mobile network information.

3. The method of claim 1, wherein the temporary mobile group identity comprises a globally unique mobile country code/mobile network code and a local multimedia broadcast/multicast service bearer service identity that is unique within a corresponding public land mobile network.

4. The method of claim 3, wherein the mobile country code/mobile network code comprises a public land mobile network identification.

5. The method of claim 3, wherein the at least a portion of the temporary mobile group identity that is transmitted in the pre-notification information comprises the mobile country code/mobile network code and the local multimedia broadcast/multicast service bearer service identity.

6. The method of claim 5, wherein the mobile country code/mobile network code comprises a public land mobile network identification.

7. The method of claim 1, further comprising: transmitting an identity of a multimedia broadcast/multicast service session for the multimedia broadcast/multicast service bearer service that is to be notified.

8. The method of claim 1, wherein the method is implemented by an access point node.

9. A non-transitory computer readable medium storing computer program instructions, the execution of which by a processor results in operations comprising:
   obtaining pre-notification information that at least partially identifies a multimedia broadcast/multicast service bearer service that is to be notified; and
   transmitting the pre-notification information to at least one mobile station, wherein the pre-notification information comprises at least a portion of a temporary mobile group identity.

10. The non-transitory computer readable medium of claim 9, wherein the at least a portion of the temporary mobile group identity that is transmitted in the pre-notification information does not comprise public land mobile network information.

11. The non-transitory computer readable medium of claim 9, wherein the temporary mobile group identity comprises a globally unique mobile country code/mobile network code and a local multimedia broadcast/multicast service bearer service identity that is unique within a corresponding public land mobile network.

12. The non-transitory computer readable medium of claim 11, wherein the mobile country code/mobile network code comprises a public land mobile network identification.

13. The non-transitory computer readable medium of claim 11, wherein the at least a portion of the temporary mobile group identity that is transmitted in the pre-notification information comprises the mobile country code/mobile network code and the local multimedia broadcast/multicast service bearer service identity.

14. The non-transitory computer readable medium of claim 13, wherein the mobile country code/mobile network code comprises a public land mobile network identification.

15. The non-transitory computer readable medium of claim 9, the operations further comprising: transmitting an identity of a multimedia broadcast/multicast service session for the multimedia broadcast/multicast service bearer service that is to be notified.

16. The non-transitory computer readable medium of claim 9, wherein the computer program instructions are executed by a processor of an access point node.

17. An apparatus, comprising:
   a processor configured to obtain pre-notification information that at least partially identifies a multimedia broadcast/multicast service bearer service that is to be notified; and
   a transmitter configured to transmit the pre-notification information to at least one mobile station, wherein the pre-notification information comprises at least a portion of a temporary mobile group identity.

18. The apparatus of claim 17, wherein the at least a portion of the temporary mobile group identity that is transmitted in the pre-notification information does not comprise public land mobile network information.

19. The apparatus of claim 17, wherein the temporary mobile group identity comprises a globally unique mobile country code/mobile network code and a local multimedia broadcast/multicast service bearer service identity that is unique within a corresponding public land mobile network.

20. The apparatus of claim 19, wherein the mobile country code/mobile network code comprises a public land mobile network identification.

21. The apparatus of claim 19, wherein the at least a portion of the temporary mobile group identity that is transmitted in the pre-notification information comprises the mobile country code/mobile network code and the local multimedia broadcast/multicast service bearer service identity.

22. The apparatus of claim 21, wherein the mobile country code/mobile network code comprises a public land mobile network identification.

23. The apparatus of claim 17, wherein the transmitter is further configured to transmit an identity of a multimedia broadcast/multicast service session for the multimedia broadcast/multicast service bearer service that is to be notified.

24. The apparatus of claim 17, wherein the apparatus comprises an access point node of a wireless communication network that comprises the at least one mobile station.

25. The apparatus of claim 24, wherein the wireless communication network comprises a global system for mobile communication enhanced data global system for mobile communication environment radio access network.

26. An apparatus, comprising:
  means for obtaining pre-notification information that at least partially identifies a multimedia broadcast/multicast service bearer service that is to be notified; and
  means for transmitting the pre-notification information to at least one mobile station, wherein the pre-notification information comprises at least a portion of a temporary mobile group identity.

27. The apparatus of claim 26, wherein the temporary mobile group identity comprises a globally unique mobile country code/mobile network code and a local multimedia broadcast/multicast service bearer service identity that is unique within a corresponding public land mobile network.

28. The apparatus of claim 26, wherein the means for obtaining comprises a processor and the means for transmitting comprises a transmitter.

29. A method comprising:
  receiving, by a mobile station, a pre-notification information that at least partially identifies a multimedia broadcast/multicast service bearer service that is to be notified; and
  determining if the pre-notification information identifies a multimedia broadcast/multicast service bearer service for a multimedia broadcast/multicast service session to be received by the mobile station, wherein the pre-notification information comprises at least a portion of a temporary mobile group identity.

30. The method of claim 29, wherein the at least a portion of the temporary mobile group identity that is transmitted in the pre-notification information does not comprise public land mobile network information.

31. The method of claim 29, wherein the temporary mobile group identity comprises a globally unique mobile country code/mobile network code and a local multimedia broadcast/multicast service bearer service identity that is unique within a corresponding public land mobile network.

32. The method of claim 31, wherein the mobile country code/mobile network code comprises a public land mobile network identification.

33. The method of claim 31, wherein the at least a portion of the temporary mobile group identity that is transmitted in the pre-notification information comprises the mobile country code/mobile network code and the local multimedia broadcast/multicast service bearer service identity.

34. The method of claim 29, further comprising: receiving an identity of a multimedia broadcast/multicast service session for the multimedia broadcast/multicast service bearer service that is to be notified.

35. The method of claim 29, further comprising: in response to determining that the pre-notification information identifies a multimedia broadcast/multicast service bearer service for a multimedia broadcast/multicast service session to be received by the mobile station, reading additional messages.

36. The method of claim 29, further comprising: in response to determining that the pre-notification information does not identify a multimedia broadcast/multicast service bearer service for a multimedia broadcast/multicast service session to be received by the mobile station, not reading additional messages.

37. A non-transitory computer readable medium storing computer program instructions, the execution of which by a processor of a mobile station results in operations comprising:
  receiving, by the mobile station, a pre-notification information that at least partially identifies a multimedia broadcast/multicast service bearer service that is to be notified; and
  determining if the pre-notification information identifies a multimedia broadcast/multicast service bearer service for a multimedia broadcast/multicast service session to be received by the mobile station, wherein the pre-notification information comprises at least a portion of a temporary mobile group identity.

38. The non-transitory computer readable medium of claim 37, wherein the at least a portion of the temporary mobile group identity that is transmitted in the pre-notification information does not comprise public land mobile network information.

39. The non-transitory computer readable medium of claim 37, wherein the temporary mobile group identity comprises a globally unique mobile country code/mobile network code and a local multimedia broadcast/multicast service bearer service identity that is unique within a corresponding public land mobile network.

40. The non-transitory computer readable medium of claim 39, wherein the mobile country code/mobile network code comprises a public land mobile network identification.

41. The non-transitory computer readable medium of claim 39, wherein the at least a portion of the temporary mobile group identity that is transmitted in the pre-notification information comprises the mobile country code/mobile network code and the local multimedia broadcast/multicast service bearer service identity.

42. The non-transitory computer readable medium of claim 37, the operations further comprising: receiving an identity of a multimedia broadcast/multicast service session for the multimedia broadcast/multicast service bearer service that is to be notified.

43. The non-transitory computer readable medium of claim 37, the operations further comprising: in response to determining that the pre-notification information identifies a multimedia broadcast/multicast service bearer service for a multimedia broadcast/multicast service session to be received by the mobile station, reading additional messages.

44. The non-transitory computer readable medium of claim 37, the operations further comprising: in response to determining that the pre-notification information does not identify a multimedia broadcast/multicast service bearer service for a multimedia broadcast/multicast service session to be received by the mobile station, not reading additional messages.

45. A user apparatus comprising:
  a receiver configured to receive a pre-notification information that at least partially identifies a multimedia broadcast/multicast service bearer service that is to be notified; and
  a control unit configured to determine if the pre-notification information identifies a multimedia broadcast/multicast service bearer service for a multimedia broadcast/multicast service session to be received by the user apparatus, wherein the pre-notification information comprises at least a portion of a temporary mobile group identity.

46. The user apparatus of claim 45, wherein the at least a portion of the temporary mobile group identity that is transmitted in the pre-notification information does not comprise public land mobile network information.

47. The user apparatus of claim 45, wherein the temporary mobile group identity comprises a globally unique mobile country code/mobile network code and a local multimedia broadcast/multicast service bearer service identity that is unique within a corresponding public land mobile network.

48. The user apparatus of claim 47, wherein the mobile country code/mobile network code comprises a public land mobile network identification.

49. The user apparatus of claim 47, wherein the at least a portion of the temporary mobile group identity that is transmitted in the pre-notification information comprises the mobile country code/mobile network code and the local multimedia broadcast/multicast service bearer service identity.

50. The user apparatus of claim 45, wherein the receiver is further configured to receive an identity of a multimedia broadcast/multicast service session for the multimedia broadcast/multicast service bearer service that is to be notified.

51. The user apparatus of claim 45, wherein the user apparatus is configured, in response to the control unit determining that the pre-notification information identifies a multimedia broadcast/multicast service bearer service for a multimedia broadcast/multicast service session to be received by the user apparatus, to read additional messages.

52. The user apparatus of claim 45, wherein the user apparatus is configured, in response to the control unit determining that the pre-notification information does not identify a multimedia broadcast/multicast service bearer service for a multimedia broadcast/multicast service session to be received by the user apparatus, to not read additional messages.

53. The user apparatus of claim 45, wherein the apparatus comprises a mobile station.

54. A user apparatus, comprising:
means for receiving a pre-notification information that at least partially identifies a multimedia broadcast/multicast service bearer service that is to be notified; and
means for determining if the pre-notification information identifies a multimedia broadcast/multicast service bearer service for a multimedia broadcast/multicast service session to be received by the user apparatus, wherein the pre-notification information comprises at least a portion of a temporary mobile group identity.

55. The user apparatus of claim 54, wherein the temporary mobile group identity comprises a globally unique mobile country code/mobile network code and a local multimedia broadcast/multicast service bearer service identity that is unique within a corresponding public land mobile network.

56. The user apparatus of claim 54, wherein the means for receiving comprises a receiver and the means for determining comprises a control unit or processor, wherein the user apparatus is user equipment.

* * * * *